April 7, 1931.  B. H. HOWARD ET AL  1,800,073
FEEDER FOR INGOT MOLDS
Filed Jan. 17, 1925
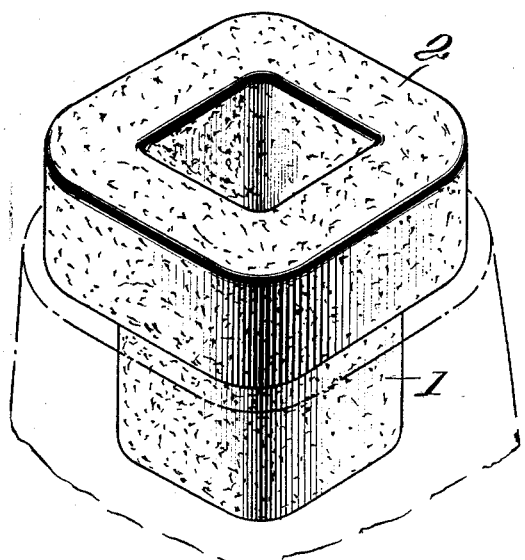
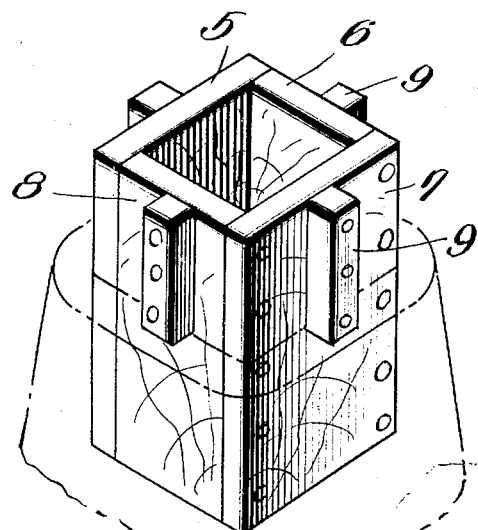
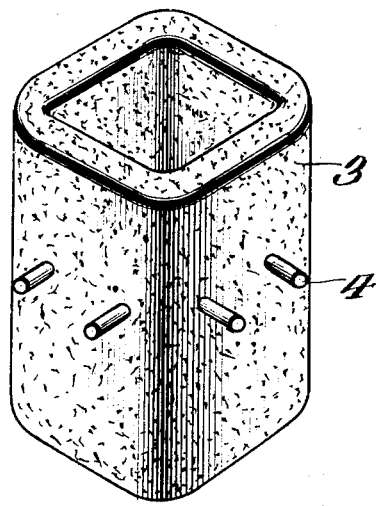
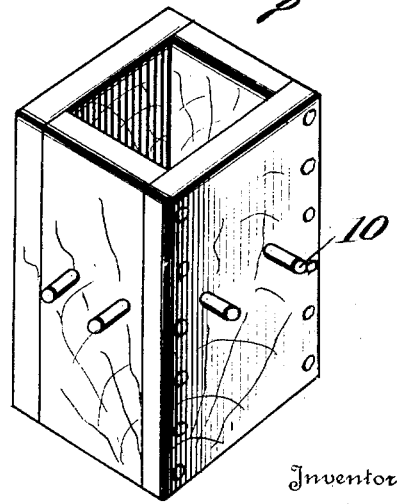
Inventors
B. H. Howard,
E. J. Turner.
By
C. A. Wright, Jr. Attorney Patented Apr. 7, 1931

1,800,073

UNITED STATES PATENT OFFICE

BLOOMFIELD H. HOWARD, OF WASHINGTON, DISTRICT OF COLUMBIA, AND ERNEST J. TURNER, OF PITTSBURGH, PENNSYLVANIA

FEEDER FOR INGOT MOLDS

Application filed January 17, 1925. Serial No. 3,172.

Our invention relates to improvements in feeders for ingot molds.

The object of our invention is to provide a feeder for ingot molds which will produce and retain the heat at the upper end of the mold to prevent "piping" and also to reduce segregation.

Another object of our invention is to provide a feeder made of combustible material, preferably of a slow burning nature so that the same will become ignited from the molten metal and will slowly burn during the cooling process so that the upper end of the ingot would be heated to keep it from cooling.

A further object of our invention is to provide a simple, cheap and effective feeder adapted to accomplish the above results.

In the accompanying drawings:—

Figure 1 is a perspective view of our improved feeder made of combustible material.

Figure 2 is a perspective view showing the feeder made of the same material, and having a modified form of supporting means.

Figure 3 is a perspective view of a feeder made of wood preferably slow burning, and showing supporting means carried thereby.

Figure 4 is a perspective view of the form of feeder shown in Figure 3 showing a modified form of supporting means.

Referring now to the drawings, 1 represents the body portion of our improved feeder which is made of a combustible material. This material could be wood, paper, or a combination of combustible materials mixed and formed into a feeder. The invention herein involved is in making a feeder of any combustible material and we do not care to limit ourselves to any specific material, or supporting means.

The body portion 1 of the feeder, in the form shown in Figure 1 is provided with an annular flange or shoulder 2, adapted to rest upon the upper end of the mold for supporting the feeder within the bore of the mold, all of which is well understood by those skilled in the art and needs no further description.

In the modification shown in Figure 2, the feeder 3 is made of a tubular form of combustible material and is provided intermediate its ends, with projections 4, for supporting the feeder with a portion thereof within the bore of the mold.

In the modification shown in Figure 3, we have shown the feeder made up of four pieces of wood 5, 6, 7 and 8 fastened together as shown, and each side is provided with an outwardly extending cleat 9 adapted to form a supporting means for the feeder as clearly shown in the drawings.

In the modification shown in Figure 4, the feeder is made of wood, and of a tubular form the same as that shown in Figure 3 and like reference numerals indicate like parts. In this form we have shown a series of supporting means 10, inserted into the outer face of the feeder intermediate the ends thereof, and are adapted to support the feeder on the upper end of the mold. In the form shown in Figures 3 and 4 any of the well known slow burning woods could be used, or the same could be chemically treated whereby the desired result would be obtained.

In operation, the feeder is placed on the mold with a portion thereof extending into the bore thereof. The molten metal is then poured through the opening in the feeder into the mold until it rises to the upper end of the feeder, both the mold and feeder being filled with molten metal. The combustible material of the feeder will be ignited by the molten metal coming in contact with the inner faces, and will continue to burn until the feeder is practically destroyed. This process will produce sufficient heat to retard the cooling of the upper end of the ingot so that the metal will have time to settle into all "pipes," thus producing a solid ingot.

Having thus fully described our invention what we claim is:—

1. As an article of manufacture, a feeder for ingot molds composed of self-supporting combustible material adapted to burn sufficiently slowly upon contact with the molten metal to supply heat to the molten metal within the feeder during the solidification of the ingot whereby the molten metal within the feeder is available for feeding metal to compensate for the shrinkage of the ingot.

2. As an article of manufacture, a feeder for ingot molds composed of self-supporting combustible material having a slow burning period of substantially the order of the period of solidification of the ingot.

3. As an article of manufacture, a feeder for ingot molds composed of self-supporting material of a slowly burning nature so that the same will become ignited by the molten metal and burn slowly during the cooling of the ingot to maintain the upper end of the ingot heated during shrinkage of the ingot.

4. An apparatus for feeding molten metal, comprising a feeder for ingot molds shaped to fit the end of the ingot mold, said member having a rigid self supporting body containing inflammable material in sufficient amount, which when burned away will supply heat to the molten metal within the feeder during the solidification of the ingot within such mold whereby the molten metal within the feeder is available for feeding metal to compensate for shrinkage of the ingot in such mold.

5. As an article of manufacture, a feeder for ingot molds comprising self-supporting combustible material adapted to burn sufficiently slowly upon contact with the molten metal to supply heat to the molten metal within the feeder during the solidification of the ingot whereby the molten metal within the feeder is available for feeding metal to compensate for the shrinkage of the ingot.

6. As an article of manufacture, a feeder for ingot molds comprising self-supporting combustible material, supporting means carried by the outer face of the feeder and said feeder adapted to burn sufficiently slowly upon contact with the molten metal to supply heat to the molten metal within the feeder during the solidification of the ingot, whereby the molten metal within the feeder is available for feeding metal to compensate for the shrinkage of the ingot.

In testimony whereof we affix our signatures.

BLOOMFIELD H. HOWARD.
ERNEST J. TURNER.